United States Patent [19]

Velasco et al.

[11] Patent Number: 4,762,900

[45] Date of Patent: Aug. 9, 1988

[54] OXAZOLIDONE POLYMER PREPARED IN THE PRESENCE OF HEXAMETHYLENE TETRAMINE

[75] Inventors: Miguel U. Velasco, Mexico City, Mexico; Kenneth A. Hodd, Hillingdon, England

[73] Assignee: National Research Development Corporation, London, England

[21] Appl. No.: 827,980

[22] PCT Filed: May 21, 1985

[86] PCT No.: PCT/GB85/00215

§ 371 Date: Feb. 21, 1986

§ 102(e) Date: Feb. 21, 1986

[87] PCT Pub. No.: WO85/05367

PCT Pub. Date: Dec. 5, 1985

[30] Foreign Application Priority Data

May 21, 1984 [GB] United Kingdom ............... 8412900

[51] Int. Cl.$^4$ ............... C08G 18/08; C08G 18/20; C08G 18/28; C08G 18/77
[52] U.S. Cl. ................ 528/54; 528/52; 528/53; 528/73
[58] Field of Search ............ 528/73, 52, 53, 54

[56] References Cited

U.S. PATENT DOCUMENTS

| | | | |
|---|---|---|---|
| 3,673,128 | 6/1972 | Hayash et al. | 521/108 |
| 3,745,133 | 7/1973 | Communale et al. | 521/129 |
| 4,022,721 | 5/1977 | Ashida | 528/53 |
| 4,070,416 | 1/1978 | Narahara et al. | 525/504 |
| 4,129,554 | 12/1978 | Karasawa et al. | 528/48 |
| 4,129,695 | 12/1978 | Bonin | 521/108 |
| 4,163,815 | 8/1979 | Cheung | 528/53 |
| 4,542,165 | 9/1985 | Kumata et al. | 521/137 |

FOREIGN PATENT DOCUMENTS

| | | | |
|---|---|---|---|
| 1915766 | 11/1969 | Fed. Rep. of Germany . | |
| 2542499 | 4/1976 | Fed. Rep. of Germany | 528/54 |
| 2551631 | 5/1976 | Fed. Rep. of Germany . | |
| 2207952 | 6/1974 | France . | |
| 2291996 | 6/1976 | France . | |
| 0129091 | 10/1979 | Japan | 528/53 |
| 1212663 | 11/1970 | United Kingdom . | |
| 1275515 | 5/1972 | United Kingdom . | |

*Primary Examiner*—Harold D. Anderson
*Assistant Examiner*—Dennis R. Daley
*Attorney, Agent, or Firm*—Cushman, Darby & Cushman

[57] ABSTRACT

A method of preparing an oxazolidone polymer which comprises reacting a vicinal polypoxide having a functionality of greater than 1 with an organic polyisocyanate or polyisothiocyanate, in the presence of a catalyst comprising an s-triazine compound or a derivative thereof, at a temperature beween 20° C. and 250° C. The catalyst is preferably hexamethylene tetramine.

7 Claims, No Drawings

OXAZOLIDONE POLYMER PREPARED IN THE PRESENCE OF HEXAMETHYLENE TETRAMINE

This invention relates to a method of curing a thermosetting resin composition into an oxazolidone polymer.

Oxazolidone polymers are well known in the art. They are usually prepared by reacting an isocyanate or isothiocyanate with a vicinal epoxide in the presence of a catalyst. The catalysts which have been used in the past include alkali metal halides, tertiary amines, and quaternary ammonium halides (eg tetraethyl ammonium bromide) as described in, for example, U.S. Pat. No. 3,020,262. More recently, catalysts consisting of phosphonium salts (U.S. Pat. No. 3,687,897) and magnesium halide/phosphine oxide complexes (U.S. Pat. No. 3,905,945) have been employed.

Many of the catalysts which have previously been employed have not favoured the production of the preferred oxazolidone structure over the production of the isocyanurate/isothiocyanurate structure in the resulting polymer, and in certain cases have catalysed the production of polymers containing hydrophilic groupings which are undesirable in the formation of polymers required to be water resistant.

It has previously been shown that the oxazolidone content of a poly(oxazolidone/isocyanurate) polymer may be increased by increasing the molar proportion of isocyanate in the starting composition used to produce the polymer. However, this leads to an increase in the brittleness of the polymer produced. The molar ratio of epoxy:isocyanate in the starting composition is preferably kept reasonably close to unity in order to avoid an increase in brittleness.

It is an object of the present invention to provide a method of preparing an oxazolidone polymer in the presence of a catalyst which favours the formation of an oxazolidone rather than an isocyanurate structure in the resulting polymer.

Accordingly, the present invention provides a method of preparing an oxazolidone polymer which comprises reacting a vicinal polyepoxide having a functionality greater than 1 with an organic polyisocyanate or polyisothiocyanate, in the presence of a catalyst comprising an aliphatic s-triazine compound or an aliphatic derivative thereof, at a temperature between 20° C. and 250° C.

The vicinal polyepoxide compound and the polyisocyanate or polyisothiocyanate compound may be any suitable compounds which are known to react together to give an oxazolidone polymeric structure.

Preferred polyepoxides include compounds containing a di- or poly-glycidyl grouping. For example, they include polyglycidyl ethers of polyhydric alcohols, such as Bisphenol A. They may also be polyglycidyl ethers of ethylene glycol, 1,2-propylene glycol, 1,2-butylene glycol, 1,5-pentanediol, 2,4,6-hexanetriol, glycerol and trimethylolpropane.

Polyglycidyl esters of polycarboxylic acids such as oxalic acid, succinic acid, gluataric acid, adipic acid, azelaic acid, phthalic acid, isophthalic acid, terephathalic acid, 2,5-naphthalene dicarboxylic acid and dimerised linolenic acid may be employed as the polyepoxide. Examples include diglycidyl adipate and diglycidyl phthalate.

Other examples include polyepoxides derived from the epoxidation of olefinically unsaturated aliphatic compounds, polyepoxides of organic amines, eg a tetraglycidyl substitued 4,4'-diaminodiphenyl-methane, and dialicyclic compounds of the general formula:

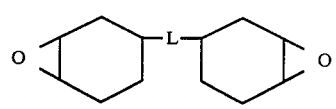

where L is a simple linkage group such as $CH_2$, $CH_2O$, CO, COO, $CH_2CH_2$, $CH_2OCH_2$, $CH_2CO$, $CH_2OCO$ and $CH_2COO$.

Although the polyepoxide preferably does not contain high concentrations of secondary groups which react with isocyanates or isothiocyanates, (eg hydroxy groups), the polyepoxide may be selected from prepolymers which contain terminal epoxy and secondary, non-terminal hydroxy groups, as described in U.S. Pat. No. 4,386,191, for example.

Suitable organic poly-isocyanate or poly-isothiocyanate compounds are the aliphatic and aromatic isocyanates including, for example, toluene-2,4-diiso-cyanate; 1,5-naphthalenediisocyanate; cumene-2,4-diisocyanate; 4-methoxy-1,3-phenylenediisocyanate; 4-chloro-1,3-phenylenediisocyanate; 4-bromo-1,3-phenylendiisocyanate; 4-ethoxy-1,3-phenylenediiso-cyanatodiphenylether; 5-6-dimethyl-1,3-phenylenediisocyanate; 2,4-dimethyl-1,3-phenylenediisocyanate; 4,4'-diisocyanatodiphenylether; benzidinediisocyanate; hexamethylene diisocyanate; 4,6-dimethyl-1,3-phenylenediisocyanate; 9-10-anthracenediisocyanate; 4,4'-diisocyanatodibenzyl; 3,3'-dimethyl-4,4'-diisocyanatodiphenylmethane; 2,6'-dimethyl-4,4'-diisocyanatodiphenyl; 2,4-di so-cyanatostilbene; 3,3'-dimethyl-4,4'-diisocyanatodiphenyl; 3,3'-dimethoxy-4,4''-diisocyanatodiphenyl; 1,4-anthracenediisocyanate; 2,5-fluorene-diisocyanate; 1,8-naphthalenediisocyanate; 2,6-diisocyanatobenzfuran; 2,4,6-toluenetriisocyanate; and 2,3,4'-triisocyanatodiphenylether.

Other organic polyisocyanates are the polyiso-cyanates described in Canadian Pat. No. 700,026 and U.S. Pat. No. 2,688,730; the phenyl indane diisocyanates which are described in U.S. Pat. No. 2,855,385, the organic diisocyanates and the organic triisocyanates which are described in U.S. Pat. No. 2,292,443; and the organic triisocyanates which are described in U.S. Pat. No. 2,929,794.

When polyisocyanates having a functionality above about 2 are employed, they are employed in small quantities in admixture with a diisocyanate.

Also included as useful isothiocyanates are the sulphur analogues for the above mentioned isocyanates.

The catalyst preferably comprises hexamethylene tetramine, an aliphatic s-triazine (1,3,5-triazine) having the following structure:

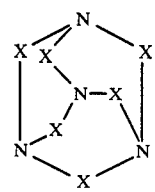

where X is $CH_2$.

Hexamethylene tetramine advantageously breaks down during the thermosetting reaction and does not therefore degrade the oxazolidone polymer produced.

The amount of s-triazine catalyst used in the present method will usually be in the range 1 part of catalyst per 10,000 parts of polyisocyanate or polyisothiocyanate by weight to 1 part of catalyst per 20 parts of polyisocyanate or polyisothiocyanate by weight. The ratio by weight of polyiosocyanate or polyisothiocyanate to catalyst is preferably more than 50:1, most preferably more than 100:1.

The reaction between the polyepoxide and the polyisocyanate or polyisothiocyanate in accordance with the present invention is carried out at a temperature between 20° C. and 250° C., preferably between 50° C. and 180° C.

Although the molar ratio of the epoxy groups to NCO or NCS groups in the reaction mixture is preferably 1:1 it may be any ratio in the range from 1:5 to 5:1, but is desirably within the range of epoxy:NCO or NCS molar ratios from 1:2 to 2:1 especially from 1:1.2 to 1.2:1.

By forming an oxazolidone polymer in accordance with the present invention, it is possible to obtain a relatively high oxazolidone content in the polymer because the catalyst incorporated in the reaction mixture unexpectedly favours the production of the oxazolidone structure rather than that of the isocyanurate or isothiocyanate.

The resulting polymers advantageously show a higher softening point and a glass transition temperature compared with those containing a lower oxazolidone content produced using catalysts previously reported for the reaction.

Furthermore, the strength of bond, if the polymer is bonded to aluminium or other metals used in engineering structures, is also unexpectedly improved by increasing the oxazolidone content of the polymer produced by the present method. There are in addition indications that the present method reduces or avoids the number of hydrophilic groups in the polymeric products, so that the product has a generally improved water resistance.

Conventional additives such as pigments, eg titanium dioxide or carbon black, fillers and flexibilizing agents may also be added to the reaction mixture. Additives forming a copolymer system such as butadiene-acrylonitrile may also be added to the composition to vary its properties in a known way.

The reaction mixture prior to curing may be used in conjunction with reinforcing fibres, which may be woven or unwoven, such as fibres of carbon, glass, aramid, polyolefin, boron or various metals to form fibre-reinforced composites and structural articles formed therefrom as will be familiar to those skilled in the composites art.

Emodiments of the present invention will now be described by way of example.

EXAMPLE 1

The preparation and properties of a cured oxazolidone polymer.

5.1 g of the resin MY750 (Trade Mark), a conventional bisphenol A diglycidyl ether epoxy resin marketed by Ciba Geigy and derived from the reaction of epichlorhydrin with bisphenol A, were mixed with 3.75 g of 4,4'-diisocyanatodiphenylene methane (MDI) (equimolar proportions) and 0.008 g of hexamethylene tetramine (herein referred to as 'hexa') (0.2% by weight of MDI) as catalyst.

After stirring at 50° C. for 15 minutes the mixture was cast in a suitable mould and heated at 50° C. for 3 h, 100° C. for 1 h and finally cured at 150° C. for 18 h.

The dark amber resinous product had a softening point of 188° C. as determined by thermomechanical analysis. Its IR (infra-red) spectrum exhibited strong absorption at 1750 and 1710 cm$^{-1}$, respectively, indicating oxalidone and isocyanurate, but none at 2250 cm$^{-1}$, ie complete reaction of the MDI. The softening point of this resin was significantly above that of MY750 resin cured with a conventional diamine, the latter resin being herein referred to as MY750 DDM which consists of 4,4'-diaminodiphenylene methane 27 parts by weight and 100 parts by weight MY750. A comparison of softening points is given in Table 1 as follows.

TABLE 1

| Softening points of cured MY750. | | |
|---|---|---|
| Resin formulation | TMA$^a$ °C. | DMTA$^b$ °C. |
| MY 750 DDM | 143 | 165 |
| MY 750 MDI/hexa (produced by the above method) | 188 | 205 |

$^a$Thermomechanical analysis (TMA) in the penetration mode.
$^b$Tan δ peak at 3 Hz by dynamic mechanical thermal analysis (DMTA)

EXAMPLE 2

5.1 g MY750 and 3.75 g MDI together with 0.08 g hexa were mixed together at 50° C. for 15 minutes followed by curing at 220° C. for 10 minutes. The hard resinous product had an IR spectrum which exhibited strong absorption at 1750 cm$^{-1}$ but no absorption at 1700 cm$^{-1}$. This is indicative of a complete conversion of MDI to oxazolidone.

EXAMPLES 3-11

The method of Example 1 was repeated in 9 further Examples. In each further Example, one or more of the following parameters were changed over those given in the method of Example 1: MY750: MDI molar ratio, concentration of hexa, and cure duration and temperature during the final curing stage (given as 150° C. for 18 hours in Example 1). The results are given in Table 2 below.

| Example | MY 750:MDI molar ratio | 'hexa' (% by weight of MDI) | Final stage cure conditions °C. | h | Softening point and Tg by TMA °C. | by DMTA °C. |
|---|---|---|---|---|---|---|
| 3 | 1:1 | 0.2 | 130 | 18 | 147 | 160 |
| 4 | 1:1 | 0.2 | 160 | 18 | 177 | — |
| 5 | 1:1 | 0.2 | 150 | 6 | 148 | 162 |
| 6 | 1:1 | 0.2 | 150 | 7 | 170 | — |
| 7 | 1:1 | 1.5 | 150 | 7 | 170 | — |

-continued

| Example | MY 750:MDI molar ratio | 'hexa' (% by weight of MDI) | Final stage cure conditions °C. | h | Softening point and Tg by TMA °C. | by DMTA °C. |
|---|---|---|---|---|---|---|
| 8 | 1:1 | 0.4 | 150 | 21 | 190 | — |
| 9 | 100:97 | 0.2 | 150 | 21 | 190 | — |
| 10 | 100:182 | 0.2 | 150 | 18 | 207 | — |
| 11 | 100:202 | 0.2 | 130 | 20 | 215 | 218 |

We claim:

1. A method of preparing an oxazolidone polymer which comprises reacting a vicinal polyepoxide having a functionality greater than 1 with an organic polyisocyanate or polyisothiocyanate, in the presence of hexamethylene tetramine or an aliphatic derivative thereof, at a temperature between 20° and 250° C.

2. A method according to claim 1 wherein the molar ratio of NCO groups or NCS groups to epoxide groups is from 1:5 to 5:1.

3. A method according to claim 2 wherein the molar ratio of NCO groups or NCS groups to epoxide groups is from 1:1.2 to 1.2:1.

4. A method according to claim 1 wherein the polyisocyanate or polyisothiocyanate is a diisocyanate or a diisothiocyanate.

5. A method according to claim 4 wherein the ratio by weight of polyisocyanate or polyisothiocyanate to catalyst is from 10,000:1 to 20:1 by weight.

6. A method according to claim 5 wherein the ratio by weight of polyisocyanate or polyisothiocyanate to catalyst is from 10,000:1 to 100:1 by weight.

7. A method according to claim 1 wherein the temperature of the reaction is between 50° C. and 180° C.

* * * * *